United States Patent [19]

Ayoola

[11] Patent Number: 4,579,297
[45] Date of Patent: Apr. 1, 1986

[54] AIR, LAND AND SEA VEHICLE

[75] Inventor: Joseph N. Ayoola, P.O. Box 17532, Los Angeles, Calif. 90017

[73] Assignee: Joseph N. Ayoola, Los Angeles, Calif.

[21] Appl. No.: 645,800

[22] Filed: Aug. 30, 1984

Related U.S. Application Data

[63] Continuation-in-part of Ser. No. 493,431, May 11, 1983, abandoned.

[51] Int. Cl.⁴ ............................................... B64D 37/00
[52] U.S. Cl. ........................................... 244/2; 244/50; 244/49; 244/106; 114/270
[58] Field of Search ................. 244/2, 49, 50, 58, 218, 244/106; 114/270

[56] References Cited

U.S. PATENT DOCUMENTS

| | | | |
|---|---|---|---|
| 2,563,731 | 8/1951 | Masterson | 244/2 |
| 2,940,688 | 6/1960 | Bland | 244/2 |
| 3,082,975 | 3/1963 | Cardwell et al. | 244/2 |
| 3,134,561 | 5/1964 | Clejan | 244/58 |
| 3,306,249 | 2/1967 | Chase | 114/270 |
| 3,666,210 | 5/1972 | Look et al. | 244/218 |

OTHER PUBLICATIONS

"Filtron", advertisement, the Filtron Co. Inc., 38-25 Bell Boulevard, Bayside, NY, NY, 3-13-50.

Primary Examiner—Trygve M. Blix
Assistant Examiner—Rodney Corl

[57] ABSTRACT

Air, Land and Sea vehicle is convertible between aircraft form, road vehicle form and boat form. The conversion between aircraft form and road vehicle forms having (4) four tires as an automobile as well as a roadable vehicle structure that are movable outwardly for highway usage, and inwardly into stored position for the aircraft form or boat form, and having storage for the wing and tail assemblies which has a foldable section for this purpose. For conversion between aircraft form and boat forms, the apparatus has a retractable or extendable water propeller as propelling means in the water, and parts arranged for steering. The wings and tail assemblies are moved inwardly into stored position including auto and aero tires moved inwardly into their water-leak-proof compartments. The conversion between boat form and aircraft forms having wings and tail assemblies as well as propelling structures that are movable outwardly for the flying form including wing-lifter to lift the wings upwardly for the sufficient clearance between the wing-level and the water-level in order to accommodate sufficient relative wind to propel the invention as a lift means, during water takeoff. The water-rudder will maintain a straight forward movement. The auto and aero engines operate until the invention takes off on the water, then, the automobile engine must be turned off. The water-propeller and rudder move inwardly into their compartments respectively.

6 Claims, 14 Drawing Figures

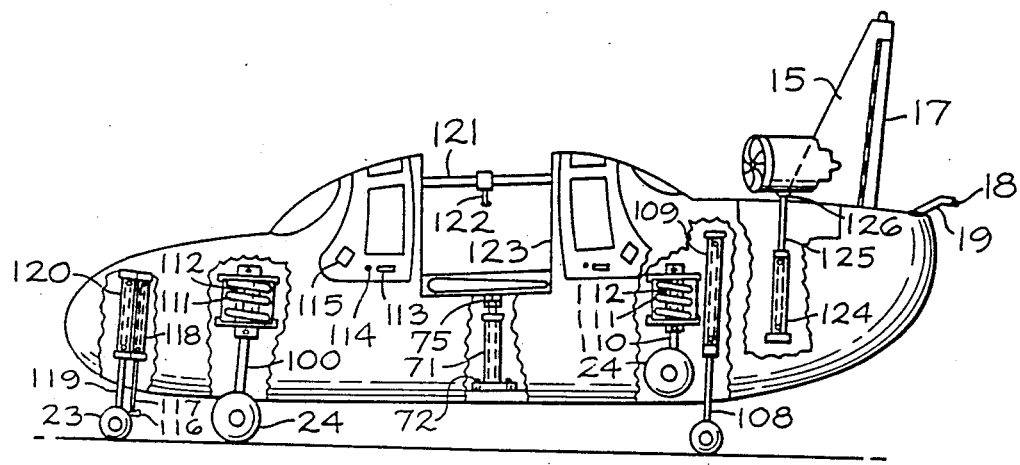
FIG. 5
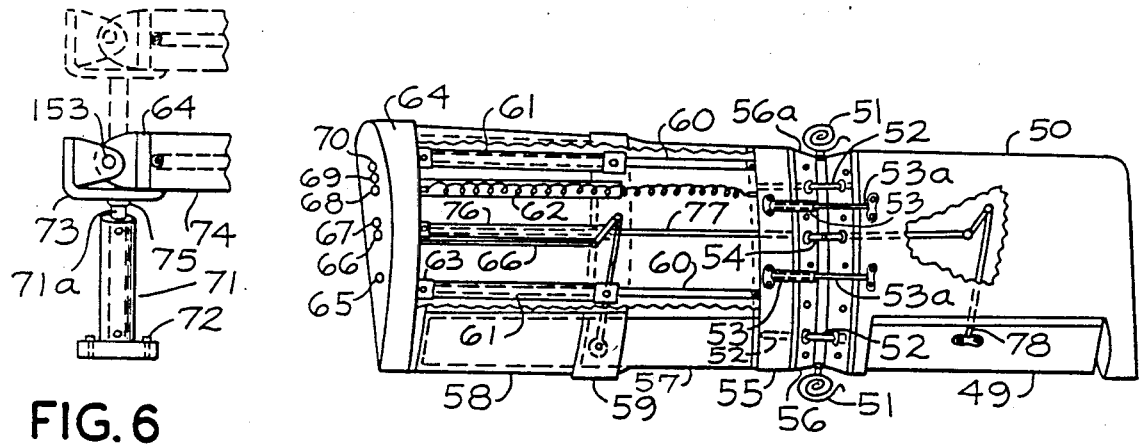
FIG. 6
FIG. 7
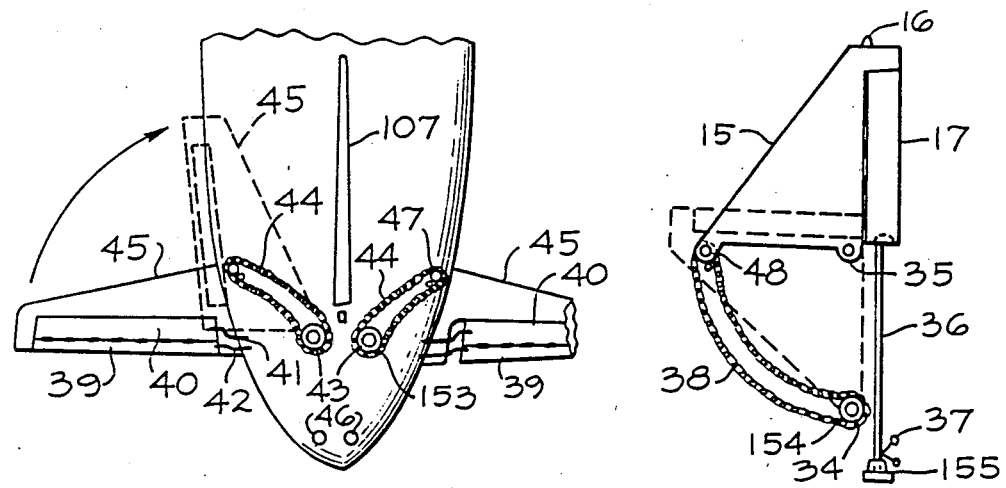
FIG. 8
FIG. 9

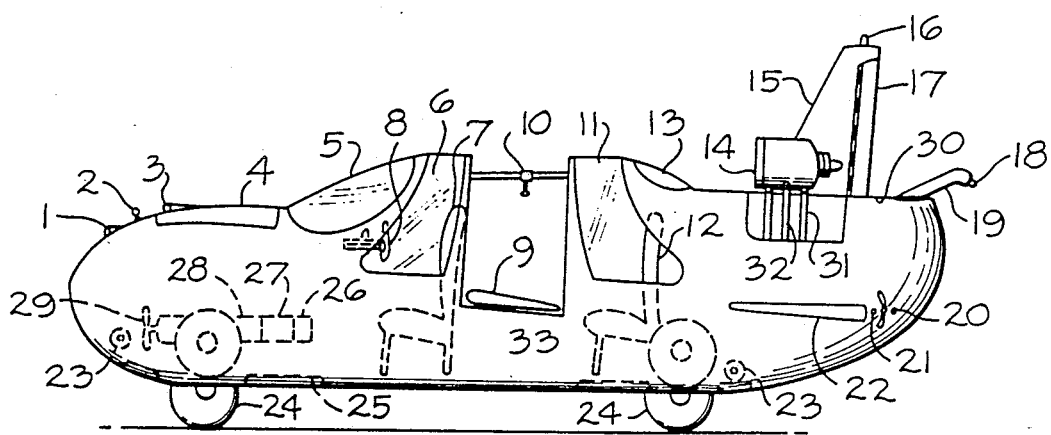
FIG. 10
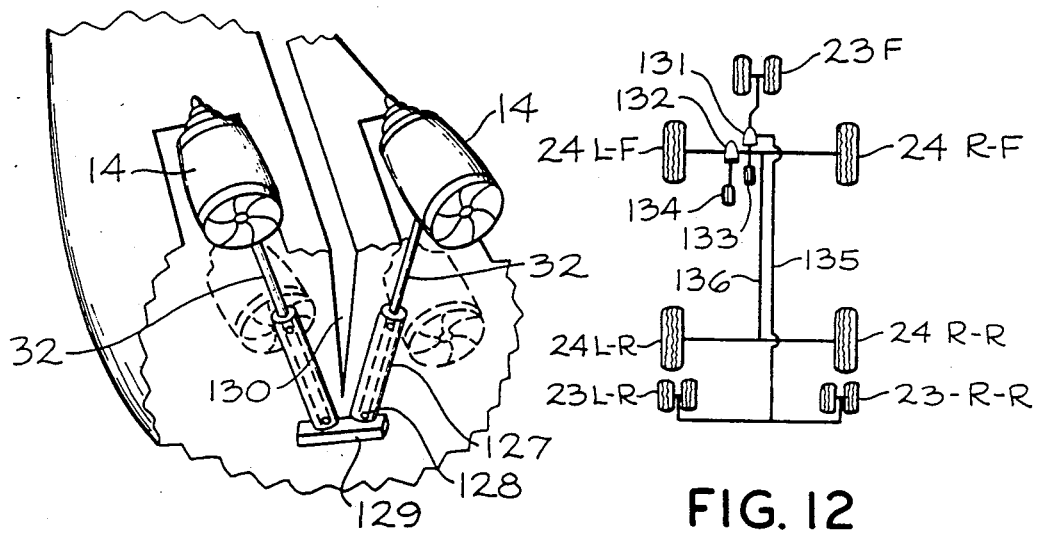
FIG. 11
FIG. 12
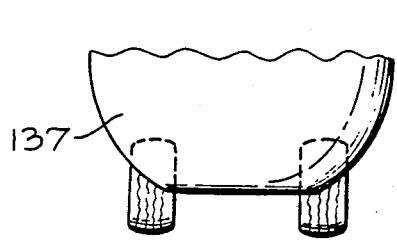
FIG. 13
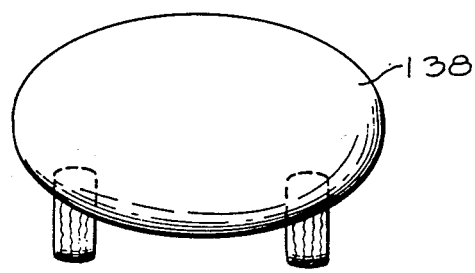
FIG. 14

AIR, LAND AND SEA VEHICLE

This application is a continuation in part of copending application Ser. No. 493,431, filed May 11, 1983 and now abandoned.

BACKGROUND OF THE INVENTION

My excellent invention, is a unique three in one (3 in 1) vehicle, which has to do with improvements in automobiles, aircraft and boats. Air, land and sea vehicle is designed to travel on the ground after the manner of an automobile, and in the air after the manner of an aircraft, and on the water after the manner of a boat. This vehicle is designed to be operated in (3) three different ways, which overcomes the deficiencies of the prior art. Such prior arts have disadvantages simply because some converting parts must be removed completely and stored separately until the time comes to change them back. Such lack of design has discouraged the use of this type of vehicle. The present invention can be operated on the highways, in the air and on the water as well, by converting it from one form to the other. All inwardly and outwardly moving parts are controlled automatically from the cockpit. And while the converting parts are not in use, they must be kept in their respective compartments.

SUMMARY OF THE INVENTION

According to the present invention, air, land and sea vehicle is provided for convenience of human need as a vehicle that can be operated in three different ways. In addition, a vehicle of the type described, an improvement in automobile, aircraft and boat is provided, whereby the pilot or operator may be able to travel on the highways, in the air and on the water, in a single machine.

The vehicle adapted to be operated on the highways, as well as in the air, such vehicle, the wheel arrangement comprises two (2) different types of tire.

First type: Air, land and sea vehicle is equipped with four (4) automobile tires.

Second type: Is a tricycle type for takeoff and landing in an extended position below the vehicle.

In carrying out such objective, the present invention is equipped with a new design air-cool-automobile-engine, with an electric motor or generator for driving all driven accessories in the absence of the main-power i,e, (Auto-engine). The apparatus includes wings, tail assemblies and jet engines as a propelling means all arranged to be moved outwardly into flying position and inwardly into their respective compartments while not in use. The vehicle adapted to be operated on the water, the apparatus includes water propeller as propelling means in the water, and water-rudder is provided in the structure with parts arranged for steering. Water-propeller and rudder are arranged to be easily moved inwardly and outwardly automatically by pressing buttons from the cockpit. The invention and the method of operation, together with additional objects and advantages thereof, will be clearly understood from the following description taken in connection with accompanied drawings.

BRIEF DESCRIPTION OF THE INVENTION

FIG. 5 Is a sectional view of the present air, land and sea vehicle, this view showing an aircraft tire, jet engine and the front automobile tire in an extended position. Also shown is the rear automobile tire and the WING-LIFTER inwardly moved.

FIG. 6 Is a pictorial view of the present WING-LIFTER.

FIG. 7 is a general arrangement of the wing construction, this view showing various parts arranged for sliding and overlapping system of the wing.

FIG. 8 Is a sectional view of the present elevator which can be folded and housed in the body or fuselage. The present elevator is electrically operated for outward and inward folding. This elevator is to be operated as an aircraft elevator in an extended position during the aircraft use of the vehicle. The apparatus includes TRIM-TAB as a pilot aid for straight and level cruise unaccelerated flight.

FIG. 9 Is a pictorial view of the present invention vertical-stabilizer which can be folded and housed in the body or fuselage. The present elevator is electrically operated for outward and inward folding. In extended position, it is to be used as an aircraft rudder for flight operation.

FIG. 10 Is a general arrangement of parts in uniform sizes, shape and material of my invention concept.

FIG. 11 Is an enlarged fragmentary sectional view of the present invention jet-engines, this view including a retractable V-construction type of a riser or carrier. This enables the vehicle to be compact enough for public usage, such as public garage and street parkings.

FIG. 12 Is the arrangement of the tire for the present invention, both automobile and aircraft tires are equipped with brake system. The automobile and the aircraft tires are retractable type, and they are hydraulically operated. The two front tires are arranged for steering. The arrangement of my aircraft tire is a tricycle type, whereby the front tire is arranged for steering, and the rear tires are for landing as a main gear of an aircraft.

FIG. 13 Is a rear view cut-away of the present air, land and sea vehicle. It has a shape like an apple so called: (APPLE-BOWL-CONSTRUCTION).

The body of my invention sits and balances on (2) two wheels and the lower section having a water-leak-proof for the wheel compartments.

FIG. 14 Is a front view cut-away, having shape like an ellipse, radially outward to the nose of my vehicle to provide the best aerodynamic control. Having an ELLIPSOID shape enables the present invention to move through the air with minimum amount of drag. The two front wheel mechanisms are connected by a steering (RADIUS BAR) to permit tract and retract position of the wheels.

DETAILED DESCRIPTION OF A PREFERRED EMBODIMENT

Figure 1:
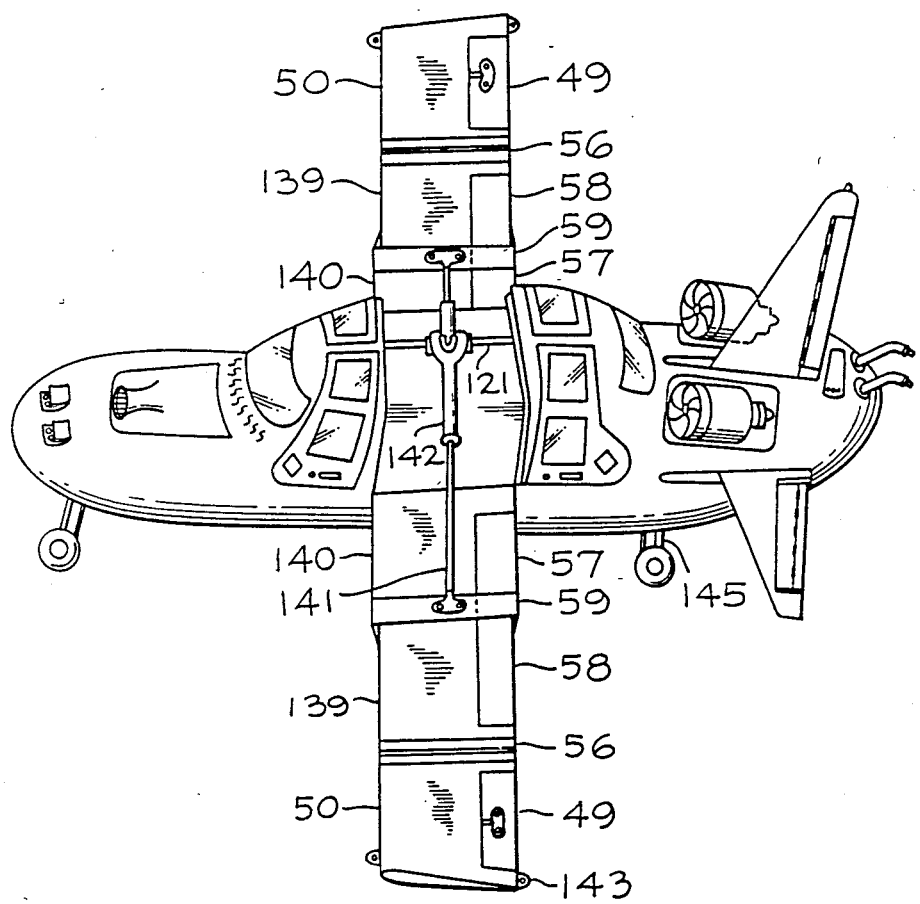
FIG. 1 Is an auxiliary view of the present invention air, land and sea vehicle, this view showing the wings, elevators, vertical-stabilizer, tricycle tire and jet engines in extended position.
Figure 2:
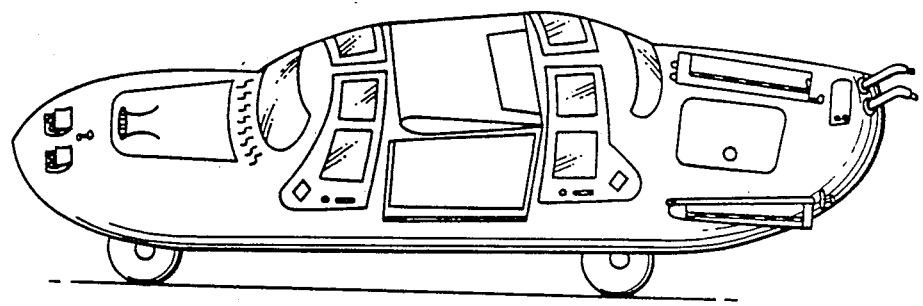
FIG. 2 Is a pictorial view of the present invention air, land and sea vehicle, whereby the wings, elevators, vertical-stabilizer aircraft tires and jet engines are inwardly moved into their respective compartments.
Figure 3:
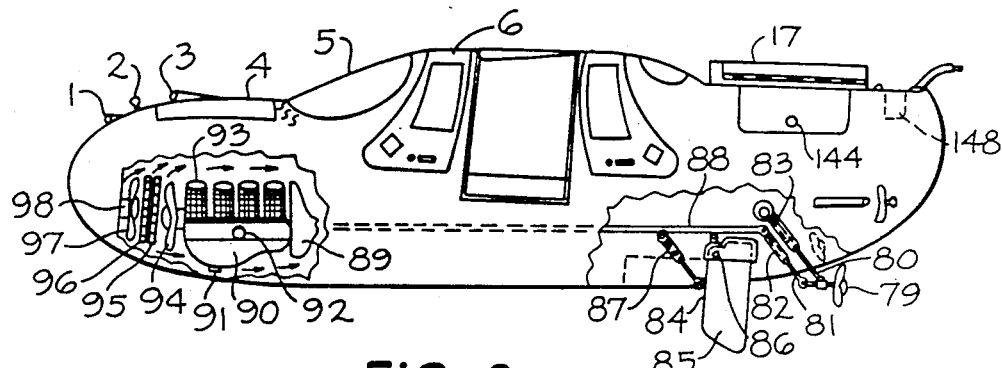
FIG. 3 Is a perspective view of the present air, land and sea vehicle which is an unsinkable with parts arranged to be used as a sailable device on the water. The present invention having water-leak-proof for the wheel compartments and the bottom of the vehicle.

With reference to the drawings, FIG. 1 shows the invention in its complete aircraft form, and FIG. 2 shows the invention in its road vehicle form, whereby the wings, vertical stabilizer, elevators and aircraft tires are moved inwardly into stored positions respectively. FIG. 3 shows steps in the conversion of the present invention from the road vehicle form to a boat form. The apparatus includes a retractable water-propeller 79 and a retractable water-rudder 85 with parts are arranged for steering the vehicle on the water during the boat use of the vehicle. The apparatus includes an air-cool-automobile-engine 90 of conventional design to provide drive for the water propeller, and also, as seen in FIG. 3, include hydraulic power system 83 and 87 to provide tract and retract position of the water-propeller and water-rudder when necessary. 82 is an extendable shaft which operates according to the movement of the hydraulic power system 83. Such water rudder is pivotally mounted upon the frame, and releasably supported on the apparatus by a pin 86 at the upper portion thereof.

FIG. 3 show the invention in its boat vehicle form. The apparatus includes a new design of an air-cool-automobile-engine which is shown in fragmentary sectional view.

FIG. 3 shows an engine 90, fan blade 94, an oil coolant 95, thermostatic control fan 98 which senses the heat and blows when necessary, and cylinder cone 93. The apparatus includes a (FLIP-FLAP) type of light 1 arranged to serve as headlight or landing lights, and 3 is designed to permit fresh air into the engine compartment for cooling system, and also the adjustment for open and close system of the window 3 is electrically operated. A hood portion 4 inwardly leads into an engine compartment.

Figure 4:
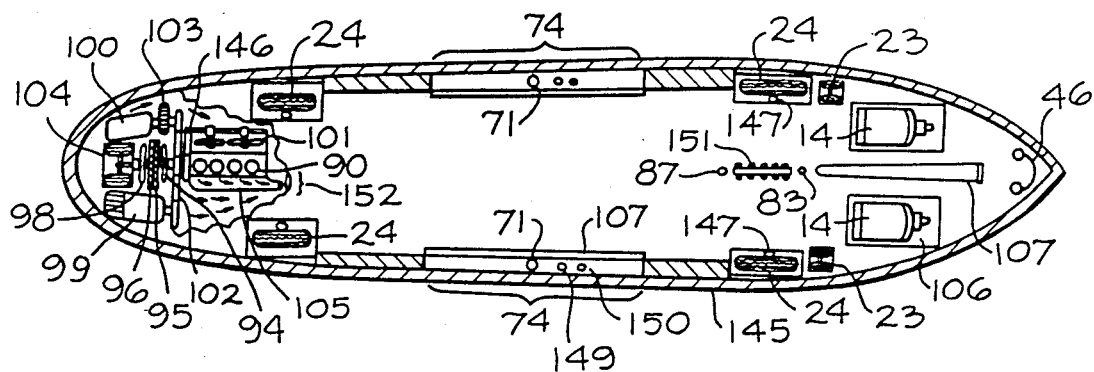
FIG. 4 Is a general arrangement of parts in uniform size, shape and material of my invention concept. The apparatus has a better aerodynamic control, having an ellipsoid shape to enable the present invention facilitate through the air with minimum amount of drag.

Also, as best seen in FIG. 4 is an engine 90 also having (3-4) three to four different ways of cooling system.

First: Is by getting fresh air into the engine compartment through and open gate 3 which is electrically operated.

Second: Is by means of a fan-blade (belt-Driven) parallel to the cylinder barrels, which can be seen clearly in FIG. 4 number 101, and 146 is the belt which is connected to the pulley at an angle with and increase-speed, i.e., the higher the R.P.M. the faster the blade rotation.

Third: Is by means of an oil-circulation from one place to the other, i.e., during the auto-engine operation, an oil tends to move from the crankcase to the coolant 95 through an oil pump, and from the coolant directly to the oil-filter 92 then back into the crankcase. Then the circulation continues, and in so doing, the engine will never be too hot, in order to cause serious damage to the engine.

Fourth: Is by means of a (HEAT-SENSOR) the thermostatic control unit 98 which monitors the engine temperature, when the engine is hot, the switch will be ON automatically. The switch is governed by the electricity.

With reference to FIG. 4 the present invention show its great fragmentary sectional view, the apparatus includes an electric motor or generator 99 which provides drive for all driven accessories in the absence of the (main-power). And at the same time to generate power for all electrical units and to act as a secondary powerplant. The apparatus includes compressor tank 100 and power unit 103 arranged to compress the air into the tank by belt driven 146. And 24 are an automobile tire, incorporated with hydraulic system 147 which permit inward and outward position of the wheels respectively. The lower section of the present invention and the wheel compartments are water-leak-proof.

A profile of the central portion 74 is the wing of the present invention, the apparatus includes WING-LIFTER 71, and 145 is a side frame portion which is defined by a contour along the wall of the apparatus. The rear upper portion 106 indicates a compartment for the jet engine 14 to be secured, and a housing for the vertical stabilizer 107 and also having a housing for water rudder 151 at the lower portion as well. The apparatus includes an exhaust pipe 46 through which the exhaust gases escape.

The rear lower portion 23 are the rear aircraft tire and the front portion 104 is included to complete a tricycle form of an aircraft tire, the front aircraft tire 104 is arranged for steering, while the rear tires are for landing as a main gear of an aircraft. The body of the apparatus has a better aerodynamic control, having an ELLIPSOID shape to enable the vehicle to move through the air with minimum amount of drag. The actuating mechanism is very simple.

With reference to FIG. 5, shown is a side sectional view of the present invention. The apparatus includes two different types of tire construction. They are an hydraulic power actuated type for tract and retract position of both aircraft and automobile tires. In order to extend the front aircraft tire, 120 is rigidly mounted upon the frame, and also having an extendable inner shaft 119 moved or projected downwardly and 118 is an extendable shaft for steering mechanisms 116 and 117. In order to extend the rear aircraft tire, 109 is rigidly mounted upon the frame, and also having an extendable inner shaft 108 moved downwardly by the hydraulic power means, and with parts arranged for brake system. FIG. 1 shows a stabilizerbar 145 to stabilize the tire for straight forward movement.

Now referring to the automobile tire construction: FIG. 5 shows the present invention front automobile tire in its extended position and the rear tire moved inwardly into stored position in its suitable compartment. However, in order to extend the front automobile tire, 110 is an extendable shaft. The principle of operation of the wheels are basically on hydraulic power for outward and inward position of the wheels. The apparatus includes an extendable shaft 112 which can be calibrated by air, for example; an (AIR-SHOCK) equipped with spring-loaded 111 to suspend the load.

With reference to FIG. 6, shown is the invention (WING-LIFTER) 71 and 71A having a suspended hinged connection 153 and carrier 73 arranged to project upward, in order to lift the wing 74 upwardly during the water takeoff. According to the (WING-LIFTER) and in carrying out such objective thereof, the HIGH position of the wing is to create more clearance or gap between the water-level and the wing-level, in order to accomodate sufficient relative wind to propel my invention as a lift means during water takeoff.

With particular reference to FIG. 7, shown is the wing and its sectional parts. See FIG. 1 for section 140, 139, 56 and 50 whereby the wings are made of certain elements which are convertible in a conventional design. Section 140 contents can be seen clearly in FIG. 7 whereby 61 are the hydraulic shafts arranged to extend their inner shafts 60 for an extension of the wing, and 76 is an extendable shaft for aileron which can be extended outwardly and inwardly according to the movement of the wing, and having a flexible linkage 54 for the overlapping system.

The apparatus includes a (COIL-FLEXIBLE-AIR-HOSE) 62 which can be stretched back and forth, for example: Telephone-cord, in its separate tube attached to the frame portion. A shaft 66 is provided to operate the flap 57 and 58 at the trailing edge. FIG. 1 shows section 139, the contents therein can be seen clearly in FIG. 7. The inner shaft 60 can be moved inwardly into 61 which are rigidly mounted to the bracket 64 attached to the hydraulic system, in so doing, FIG. 1 section 139 will slide into section 140, and the roof hydraulic power system 142 will retract 141, in order to project the wing from horizontal position into vertical position and also 50 will overlap, with parts arranged for overlapping system to be described. FIG. 1 shows section 56 which can be seen clearly in FIG. 7. The wing is equipped with spring-loaded 51 one at the leading edge and another at the trailing edge of the wing. Their purpose is to assist the hydraulic power system 53, in order to lift section 50 upward. And 53 are very strong hydraulic power units which comes from 62 which is a direct power air-hose from the control unit to push and open the hinge 56A pivotally attached to section 50 with an associated spring-loaded to assist 53 which are hydraulically operated, and 53A are designed to be moved outwardly from 53 and inwardly to overlap the wing section 50. See FIG. 2 for illustration and how the wing overlaps on the body of the invention. Locks 52 are electrically operated. Their purpose is to lock the wing section 50 in horizontal position firmly in flying configuration. The actuating mechanism is by providing a shaft incorporated with gear and in rotation the shaft is also arranged to extend into a socket of the section 50 to stabilize the wing against rearward thrust and also against lift and pitch control during flight. So the wing is electrically, mechanically and hydraulically operated for the overlapping system of the wing. 49 is an aileron which operates by a linkage.

FIG. 8 shows the tail assembly 45 comprising a pair of horizontal elevators which arrangement is to be conveniently moved outwardly into flying position and inwardly into stored position in their suitable compartments. The elevator consists of (2) two ply horizontal wall portions as a frame and the inner wall portion is attached to the vertical-electric-motor-shaft 153 incorporated with gear. The gear is attached to the chain 44 and the chain is connected to 47 which is rigidly mounted upon the outer edge of the frame, whereby the elevator is attached to the chain by a finger, and such finger is pivotally attached to the elevator in an arrangement to be moved along with the chain. Electric motor 43 provides outward and inward folding of the present elevator. The present invention includes (TRIM-TAB) 39 to act as a (PILOT-AID) for straight and level cruise unaccelerated flight. Such trim-tab is a conventional retractable type, and 42 is the actuating mechanism for the trim-tab while 41 is for the elevator.

With reference to FIG. 9 for the vertical stabilizer, the present invention includes tail assembly 15 which arrangement is to be conveniently moved outwardly into flying position and inwardly into its suitable compartment. The vertical stabilizer 15 is pivotally mounted upon the frame 35, and housing 107 consist of (2) two ply vertical wall portions as a frame and the bottom wall portion attached to the Horizontal-Electric-Motor-Shaft 154 incorporated with gear. The gear is attached to the chain 38 and the chain is connected to 48 which is rigidly mounted upon the outer edge of the frame 107 whereby the vertical stabilizer is attached to the chain by a finger, and such finger is pivotally attached to the vertical stabilizer in arrangement to move along with the chain direction. The electric-motor 34 provides upward and downward folding of the vertical stabilizer.

The apparatus includes a retractable aircraft rudder 17 controlled in a conventional manner. In extended position, it projects a shaft 36 downwardly below the fuselage which is rigidly mounted upon an associated longitudinal bar 155 which accomodates its rotatable shaft.

With reference to FIG. 10 the present invention shows a side elevational view, and also shows various parts arranged to complete air, land and sea vehicle. The present invention includes a (LIFT-UP) type doors, and electrically operated windows which slide into the upper roof. The operator or pilot will be able to operate all windows and doors with suitable controls from the cock pit. The apparatus includes suitable compartment and suitable controls for the operation, not shown. The wing 9 includes roof hydraulic mechanism 10 for projecting the wing from its horizontal position into vertical position. See FIG. 1 for illustration. The steering wheel 8, front seat 7 and rear seat 12, Jet engine 14 in extended position, a retractable hydraulic riser or carrier 32 and bracket 31 to support the load are also shown.

With reference to FIG. 11 the rear portion of the apparatus shows a V-construction type of a jet carrier 127 rigidly mounted upon a suitable bracket structure 129 carried by the fuselage. The present invention tail assembly construction is to be conveniently moved. 32, the inner shaft, moves radially outward into flying position in a conventional manner. See illustration in FIG. 11. 32 are to be moved inwardly by fluid operated cylinders and the jet engines will be retracted into stored position in their suitable compartments respectively during road use of the vehicle.

With particular reference to FIG. 12, shown is the wheel arrangement of the present invention, both automobile and aircraft tires being equipped with brake systems. The present invention wheel arrangement comprises two different types. First type: The present invention is equipped with four (4) automobile tires. Second type: Is a tricycle type for takeoff and landing. The way and manner of converting the apparatus from its aircraft vehicle form to a road vehicle form can be seen and understood in FIG. 5 which shows both 24 as an automobile tire and 23 as an aircraft tire on the ground together with its principle of operation as described above.

The first tire construction is an extendable or retractable type of an automobile tire which operates principally on hydraulic power system. The arrangement is to be moved outwardly in its road vehicle form and inwardly into their water-leak-proof compartments, during the boat or aircraft use of the vehicle. The (2) two front tires 24 are arranged for steering, and connected by a steering (RADIUS-BAR) which permits tract and retract position respectively.

The second tire construction is an extendable or retractable tricycle type of an aircraft tire, which operates principally on hydraulic power system. In extended position it is to be used for take-off and landing. The front tire is arranged for steering and the rear tires are for landing as a main-gear of an aircraft.

With reference to FIG. 13, shown is a rear view cut-away of the present invention. It has a shape like an apple, so called: (APPLE-BOWL-CONSTRUCTION). The body of my invention sits and balances on two wheels. The lower section is water-leak-proof as are the wheel compartments.

With reference to FIG. 14, the present invention shows the front view cut-away having an (ELLIPSOID-SHAPE) which acts radially outward to the nose of my vehicle to provide the best aerodynamic control. This enables the present invention to move through the air with minimum amount of drag. According to the present invention air, land and sea vehicle is provided, whereby a single person may operate a vehicle in three different ways with suitable controls which are readily convertible from one form to the other. In addition, the present invention is provided for convenience of human need as a transportation to be able to travel in the air, on the ground and on the water as well, in a single machine. The present invention is equipped with a suitable controls, whereby the pilot or operator have access to the controls by pressing buttons for a quick conversion, simply because the wings, vertical stabilizer, elevators, auto and aero tires and all inwardly and outwardly moving parts are automatically controlled from the cock pit. And to make more complex of the vehicle, the present invention is an unsinkable and an unbeatable, the most sophisticated machine, ever built, and no vehicle or other additional transportation means are required. It is to be understood that the form of my invention herein shown and described is to be taken as a preferred example of the same and that various changes in the shape, size and arrangement of parts may be resorted to without departing from the spirit of my invention or the scope of the subjoined claims.

I claim:
1. Air, land and sea vehicle comprising:
  (a) a vehicle body;
  (b) wings having conversion means between a position for air use and a stowed position for land and sea use, said conversion means comprising a hydraulic cylinder extending an inner shaft for telescopically extending the wings, roof hydraulic power means for rectracting the wings and further hydraulic power means for overlapping the wings atop a vehicle roof and into said stowed position;
  (c) wing lifter means supported between the wings and a frame of the vehicle, said wing lifter means comprising power means for lifting said wings during water takeoff so as to accomodate sufficient relative wind to lift the vehicle from the water;
  (d) jet engines mounted on a carrier attached to said vehicle frame, said carrier being extendible radially outward into flying position, and retractible inwardly into a stored position during road use of the vehicle;
  (e) a vertical stabilizer mounted on said frame comprising two-ply vertical wall portions, and a bottom portion attached to an electric motor power means for moving said stabilizer outwardly into a flying position and inwardly into a stored position within a compartment;
  (f) a tail assembly on said frame comprising a pair of horizontal elevators attached to an electric motor power means for moving said elevators outwardly into flying position and inwardly into a stored position;
  (g) auto and aero tire means mounted on said vehicle for extendable or retractable movement, and power means for moving said tire means outwardly into a use position and inwardly into a stored position, and water-leak-proof compartments surrounding said tire means;
  (h) propelling means comprising a water propeller for propelling said vehicle on the water, and power means for retracting and extending said water propeller;
  (i) water steering means comprising a water rudder and power means for retracting said rudder into a stored position and for extending said rudder into a water steering position;
  (j) a secondary power plant for driving accessories in the absence of main power;
  (k) a main power plant having multiple cooling means including free airflow cooling, fan forced air cooling, and oil circulation means having thermostatic control; and
  (l) said vehicle body having a shape and arrangement in the form of an ellilpsoid to facilitate movement through the air with a minimum amount of drag.

2. Air, land and sea vehicle of claim 1 wherein said wing has sectional parts arranged for sliding, retraction and overlapping, said hydraulic cylinder causing said sectional parts to telescopically slide into each other, said roof hydraulic power means retracting said wings from a horizontal position to an upward vertical position and said further hydraulic power means causing said wings to overlap each other on top of said vehicle roof.

3. Air, land and sea vehicle of claim 1 wherein said wing lifter power means includes a hydraulic power means and extendible shaft.

4. Air, land and sea vehicle of claim 1 wherein said carrier for said jet engines comprises a V-shape frame, one of said jet engines being mounted atop each leg of said V-shape frame for extension and retraction.

5. Air, land and sea vehicle of claim 1 wherein said auto and aero tire means comprise two independent wheel systems, said auto tire means comprising four extendible and retractible wheels adapted for road useage, said aero tire means comprising a retractible and extendible tricycle configuration having a steerable nose wheel and two main landing wheels.

6. Air, land and sea vehicle of claim 1 wherein said secondary powerplant for driving accessories in the absence of main power is an electric generator and motor arranged to drive all electric accessories and to act as a secondary powerplant.

* * * * *